United States Patent
Jahnke et al.

(10) Patent No.: US 11,424,465 B2
(45) Date of Patent: *Aug. 23, 2022

(54) LOW PRESSURE CARBON DIOXIDE REMOVAL FROM THE ANODE EXHAUST OF A FUEL CELL

(71) Applicant: FuelCell Energy, Inc., Danbury, CT (US)

(72) Inventors: Fred C. Jahnke, Rye, NY (US); Matthew A. Lambrech, Sherman, CT (US)

(73) Assignee: FuelCell Energy, Inc., Danbury, CT (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/008,871

(22) Filed: Sep. 1, 2020

(65) Prior Publication Data

US 2020/0403260 A1     Dec. 24, 2020

Related U.S. Application Data

(63) Continuation of application No. 16/119,389, filed on Aug. 31, 2018, now Pat. No. 10,797,332.

(51) Int. Cl.
   *H01M 4/02*      (2006.01)
   *H01M 8/0668*    (2016.01)
   (Continued)

(52) U.S. Cl.
   CPC ........ *H01M 8/0668* (2013.01); *B01D 53/047* (2013.01); *B01D 53/1418* (2013.01);
   (Continued)

(58) Field of Classification Search
   CPC ........................................... H01M 8/02
   See application file for complete search history.

(56) References Cited

U.S. PATENT DOCUMENTS

| 2004/0115492 A1* | 6/2004 | Galloway | ........... C10J 3/005 429/426 |
| 2009/0123791 A1 | 5/2009 | Takahashi et al. | |
| 2010/0216039 A1 | 8/2010 | Jahnke et al. | |

FOREIGN PATENT DOCUMENTS

| EP | 1 205 433 A1 | 5/2002 |
| FR | 3052919 A1 | 12/2017 |

(Continued)

OTHER PUBLICATIONS

International Search Report and Written Opinion in PCT/US2019/048726 dated Nov. 8, 2019 (10 pages).

(Continued)

*Primary Examiner* — Jacob B Marks
(74) *Attorney, Agent, or Firm* — Foley & Lardner LLP

(57) ABSTRACT

A fuel cell system for removing carbon dioxide from anode exhaust gas includes: a fuel cell having an anode configured to output an anode exhaust gas comprising hydrogen, carbon monoxide, carbon dioxide, and water; an anode gas oxidizer; and an absorption system configured to receive the anode exhaust gas, the absorption system including: an absorber column configured to absorb the carbon dioxide from the anode exhaust gas in a solvent and to output a resultant gas comprising hydrogen and a hydrocarbon that is at least partially recycled to the anode; and a stripper column configured to regenerate the solvent and to output a carbon dioxide-rich stream. The anode gas oxidizer is configured to receive and oxidize an anode gas oxidizer input stream and at least a portion of the carbon dioxide-rich stream. The anode gas oxidizer input stream comprises a portion of the anode exhaust gas.

23 Claims, 5 Drawing Sheets

(51) Int. Cl.
  *H01M 8/04089*  (2016.01)
  *H01M 8/0637*  (2016.01)
  *H01M 8/04119*  (2016.01)
  *B01D 53/14*  (2006.01)
  *B01D 53/047*  (2006.01)

(52) U.S. Cl.
  CPC ..... *B01D 53/1425* (2013.01); *B01D 53/1475* (2013.01); *H01M 8/04097* (2013.01); *H01M 8/04126* (2013.01); *H01M 8/0637* (2013.01); *B01D 2252/204* (2013.01); *B01D 2252/2026* (2013.01); *B01D 2256/16* (2013.01); *B01D 2257/504* (2013.01)

(56) References Cited

FOREIGN PATENT DOCUMENTS

| | | |
|---|---|---|
| JP | 2013-045535 A | 3/2013 |
| WO | WO-01/04046 A1 | 1/2001 |
| WO | WO-2005/012166 A1 | 2/2005 |
| WO | WO-2009/046721 A1 | 4/2009 |
| WO | WO-2013/144730 | 10/2013 |
| WO | WO-2015/011566 | 1/2015 |
| WO | WO-2017/189744 A1 | 11/2017 |

OTHER PUBLICATIONS

International Search Report and Written Opinion on PCT/IB2019/052136 dated Jun. 14, 2019 (10 pages).
Notice of Allowance in U.S. Appl. No. 17/017,244 dated May 3, 2022.

\* cited by examiner

| Stream No. | 142 | 132 | 111 | 124 | 138 | 128 | 135 | 145 |
|---|---|---|---|---|---|---|---|---|
| Name | HC Feed | Anode Exhaust (AE) Out | Cooled Shift Outlet | Total hydrogen recycled | Tot AE/CO2 to Anode Gas Oxidizer (AGO) | Total HC feed to fuel cell | Air to AGO | Cathode exhaust to atmosphere |
| Molar flow lbmol/hr | 50.01 | 431.82 | 292.09 | 25.59 | 262.04 | 75.60 | 948.67 | 951.69 |
| Mass flow lb/hr | 870.6 | 12,229.0 | 9,711.7 | 166.0 | 9,465.3 | 1,036.6 | 27,264.3 | 27,258.7 |
| Temp F | 75° | 1129° | 89° | 100° | 124° | 81° | 59° | 364° |
| Pres psia | 30.00 | 16.05 | 14.80 | 17.20 | 17.20 | 17.20 | 14.70 | 14.70 |
| SCFM | 316.30 | 2,731.12 | 1,847.37 | 161.87 | 1,657.28 | 478.16 | 6,000.00 | 6,019.13 |
| Average mol wt | 17.41 | 28.32 | 33.25 | 6.4871 | 36.1223 | 13.7111 | 28.7395 | 28.64 |
| Actual dens lb/ft3 | 0.0914 | 0.0267 | 0.0838 | 0.0186 | 0.0996 | 0.0407 | 0.0759 | 0.0476 |
| Actual vol ft3/min | 158.74 | 7643.08 | 1931.97 | 148.93 | 1584.27 | 424.93 | 5985.74 | 9542.03 |
| Cp Btu/lbmol-F | 8.85 | 10.52 | 8.46 | 7.03 | 8.80 | 8.24 | 6.99 | 7.33 |

| Components | lb-mole/hr | mole % | lb-mole/hr | mole % | lb-mole/hr | mole % | lb-mole/hr | mole % | lb-mole/hr | mole % | lb-mole/hr | mole % | lb-mole/hr | mole % | lb-mole/hr | mole % |
|---|---|---|---|---|---|---|---|---|---|---|---|---|---|---|---|---|
| Hydrogen | 0.00 | 0.00 | 49.32 | 11.42 | 63.98 | 21.91 | 21.91 | 85.61 | 42.07 | 16.06 | 21.91 | 28.98 | 0.00 | 0.00 | 0.00 | 0.00 |
| Methane | 46.91 | 93.80 | 0.33 | 0.08 | 0.33 | 0.11 | 0.11 | 0.44 | 0.22 | 0.08 | 47.02 | 62.20 | 0.08 | 0.01 | 0.08 | 0.01 |
| Carbon Monoxide | 0.00 | 0.00 | 19.82 | 4.59 | 5.17 | 1.77 | 1.77 | 6.91 | 3.40 | 1.30 | 1.77 | 2.34 | 0.00 | 0.00 | 0.00 | 0.00 |
| Carbon Dioxide | 0.55 | 1.10 | 193.62 | 44.84 | 208.28 | 71.31 | 1.35 | 5.29 | 206.92 | 78.97 | 1.90 | 2.52 | 0.00 | 0.00 | 0.00 | 0.00 |
| Water | 0.00 | 0.00 | 167.90 | 38.88 | 13.51 | 4.62 | 0.16 | 0.64 | 8.88 | 3.39 | 0.16 | 0.22 | 52.69 | 5.54 | 52.69 | 5.54 |
| Nitrogen | 0.55 | 1.10 | 0.83 | 0.19 | 0.83 | 0.28 | 0.28 | 1.10 | 0.55 | 0.21 | 0.83 | 1.10 | 742.33 | 78.25 | 742.88 | 78.06 |
| Oxygen | 0.00 | 0.00 | 0.00 | 0.00 | 0.00 | 0.00 | | | | | | | 198.75 | 20.74 | 94.13 | 9.89 |
| Ethane | 0.95 | 1.90 | | | | | | | | | 0.95 | 1.26 | 0.00 | 0.00 | 0.00 | 0.00 |
| Propane | 0.80 | 1.60 | | | | | | | | | 0.80 | 1.06 | | | | |
| N-Butane | 0.25 | 0.50 | | | | | | | | | 0.25 | 0.33 | | | | |
| Total | 50.01 | 100.00 | 431.82 | 100.00 | 292.09 | 100.00 | 25.59 | 100.00 | 262.04 | 100.00 | 75.60 | 100.00 | 948.67 | 100.00 | 951.69 | 100.00 |

| | | | | | | | | |
|---|---|---|---|---|---|---|---|---|
| mmbtu/hr fuel | 17.764 | 7.889 | 7.399 | 2.534 | 4.888 | 20.297 | 0.000 | 0.028 |

FIG. 5

LOW PRESSURE CARBON DIOXIDE REMOVAL FROM THE ANODE EXHAUST OF A FUEL CELL

CROSS REFERENCE TO RELATED APPLICATIONS

The present application is a continuation of U.S. patent application Ser. No. 16/119389, filed Aug. 31, 2018, the contents of which are incorporated herein in their entirety.

FIELD

The present disclosure relates to fuel cells. In particular, the present disclosure relates to a system and method for removing carbon dioxide from the anode exhaust of a fuel cell. The systems and methods described in the present disclosure may be used with any type of fuel cells, and particularly with high temperature fuel cells such as molten carbonate fuel cells and solid oxide fuel cells.

The present disclosure relates to fuel cells. In particular, the present disclosure relates to a system and method for removing carbon dioxide from the anode exhaust of a fuel cell. The systems and methods described in the present disclosure may be used with any type of fuel cells, and particularly with high temperature fuel cells such as molten carbonate fuel cells and solid oxide fuel cells.

BACKGROUND

A fuel cell is a device which uses an electrochemical reaction to convert chemical energy stored in a fuel such as hydrogen or methane into electrical energy. Generally, a fuel cell has an anode, a cathode, and an electrolyte layer that together drive chemical reactions that produce electricity. Anode exhaust, which may comprise a mixture of hydrogen, carbon monoxide, and carbon dioxide, is produced as a byproduct from the anode of the fuel cell. The anode exhaust contains useful byproduct gases such as hydrogen and carbon monoxide, which can be exported as syngas for other uses, such as fuel for the fuel cell or feed for other chemical reactions. However, to prepare the anode exhaust to be suitable for such uses, the carbon dioxide present in the anode exhaust must be removed.

A need exists for improved technology, including a fuel cell system and operation method in which anode exhaust is recycled to improve the efficiency of a high temperature fuel cell and to increase the overall fuel utilization.

SUMMARY

In certain embodiments, a fuel cell system for removing carbon dioxide from anode exhaust gas comprises a fuel cell (e.g., a molten carbonate fuel cell or a solid oxide fuel cell) having an anode configured to output an anode exhaust gas comprising hydrogen, carbon monoxide, carbon dioxide, and water. The system further includes a shift reactor configured to receive a first portion of the anode exhaust gas and to perform a water-gas shift reaction to produce an output stream primarily comprising hydrogen and carbon dioxide; an anode gas oxidizer; and an absorption system configured to receive the output stream from the shift reactor. The absorption system includes an absorber column configured to absorb the carbon dioxide from the output stream in a solvent and to output a resultant gas comprising mainly hydrogen with CO, $CO_2$ and some hydrocarbon that is at least partially recycled to the anode; and a stripper column configured to regenerate the solvent and to output a carbon dioxide-rich stream to the anode gas oxidizer. The absorption system may be an amine absorption system or a physical solvent absorber system. The anode gas oxidizer is configured to receive and oxidize an anode gas oxidizer input stream and at least a portion of the carbon dioxide-rich stream. The anode gas oxidizer input stream comprises one of a second portion of the anode exhaust gas or a portion of the output stream from the shift reactor.

In one aspect, a portion of the carbon dioxide rich stream that is not fed to the anode gas oxidizer may be captured.

In one aspect, part or all of the hydrogen rich gas from the absorber may be exported and/or recycled.

In one aspect, the shift reactor may be eliminated and $H_2+CO$ may be recycled or exported instead of low purity $H_2$.

In one aspect, the anode gas oxidizer may be configured to oxidize the second portion of the anode exhaust gas to produce hot oxidant gas to be received at a cathode.

In one aspect, the amount of gas sent to the absorption system is determined by the amount of gas sent to the anode gas oxidizer, which is needed to provide the heat required by the overall system.

In one aspect, the solvent may include an amine solution.

In one aspect, the solvent may include mixtures of dimethyl ethers of polyethylene glycol. These solvents may operate at higher pressure, but may require less heat to regenerate.

In one aspect, the system may include a first heat exchanger located upstream of the shift reactor, the first heat exchanger configured to cool the first portion of the anode exhaust gas; and a second heat exchanger located downstream of the shift reactor, the second heat exchanger configured to cool the output stream.

In one aspect, the system may include a water recovery system downstream of the second heat exchanger, the water recovery system configured to recover water from the cooled output stream and to recycle the recovered water to the anode;

In one aspect, the anode may be configured to receive a fuel gas comprising the resultant gas from the absorber column, the recovered water from the water recovery system, and a hydrocarbon stream comprising at least one of methane, natural gas, propane or other hydrocarbon.

In one aspect, the system may include a pressure swing adsorption system configured to receive at least a portion of the resultant gas from the absorber column and to separate hydrogen from the resultant gas. The pressure swing adsorption system may be configured to output a first stream comprising the hydrogen and a second stream comprising mainly carbon dioxide, CO, and unrecovered $H_2$ with some the hydrocarbon. The second stream may be recycled to the anode or sent to the anode gas oxidizer.

In one aspect, the anode gas oxidizer may be configured to receive a pre-heated air stream.

In one aspect, the system may include a cathode configured to output a cathode exhaust gas. The cathode exhaust gas may be configured to heat an air stream to produce the pre-heated air stream, and/or to heat the fuel gas upstream of the anode and/or heat the stripper bottom to produce a lean (low $CO_2$ containing) solvent.

In certain embodiments, a method of removing carbon dioxide from fuel cell anode exhaust gas includes outputting anode exhaust gas comprising hydrogen, carbon monoxide, carbon dioxide, and water from the anode; receiving a first portion of the anode exhaust gas in a shift reactor; receiving an anode gas oxidizer input stream in an anode gas oxidizer;

performing a water-gas shift reaction in the shift reactor to produce an output stream primarily comprising hydrogen and carbon dioxide; receiving the output stream from the shift reactor in an absorption system comprising an absorber column having a solvent therein and a stripper column; absorbing the carbon dioxide from the output stream in the solvent and outputting, from the absorber column, a resultant gas comprising mainly hydrogen with some $CO_2$, CO and hydrocarbon that is at least partially recycled to the anode; regenerating the solvent and outputting, from the stripper column, a carbon dioxide-rich stream; and oxidizing the anode gas oxidizer input stream and at least a portion of the carbon dioxide-rich stream to produce an oxidant gas. The anode gas oxidizer input stream comprises one of a second portion of the anode exhaust gas or a portion of the output stream from the shift reactor. The solvent may include an amine solution or mixtures of dimethyl ethers of polyethylene glycol.

In one aspect, the method may include capturing a portion of the carbon dioxide-rich stream that is not fed to the anode gas oxidizer.

In one aspect, the method may include cooling the first portion of the anode exhaust gas prior to entering the shift reactor; and cooling the output stream of the shift reactor.

In one aspect, the method may include recovering water from the cooled output stream; and recycling the recovered water to the anode.

In one aspect, the method may include receiving a fuel gas at the anode that comprises the resultant gas from the absorber column, the recovered water from the water recovery system, and a hydrocarbon stream comprising at least one of methane, natural gas, propane or other hydrocarbon.

In one aspect, the method may include heating the fuel gas, upstream of the anode, using cathode exhaust gas.

In one aspect, the method may include separating hydrogen from the resultant gas using a pressure swing adsorption system.

In one aspect, the method may include outputting, from the pressure swing adsorption system, a first stream comprising hydrogen; outputting, from the pressure swing adsorption system, a second stream comprising carbon dioxide and the hydrocarbon; and recycling the second stream to the anode.

In one aspect, the method may include heating an air stream using cathode exhaust gas to form a pre-heated air stream; and providing the pre-heated air stream to the anode gas oxidizer.

In one aspect, the method may not include a shift reactor and $H_2$+CO is recycled or exported instead of low purity $H_2$.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein will become apparent in the detailed description set forth herein and taken in conjunction with the accompanying drawings.

BRIEF DESCRIPTION OF THE DRAWINGS

FIG. 5 is a table providing examples of compositions, temperatures and pressures of various gas streams in the system of FIG. 2.

DETAILED DESCRIPTION

Before turning to the figures, which illustrate the exemplary embodiments in detail, it should be understood that the claimed systems and methods are not limited to the details or methodology set forth in the description or illustrated in the figures.

Figure 1:
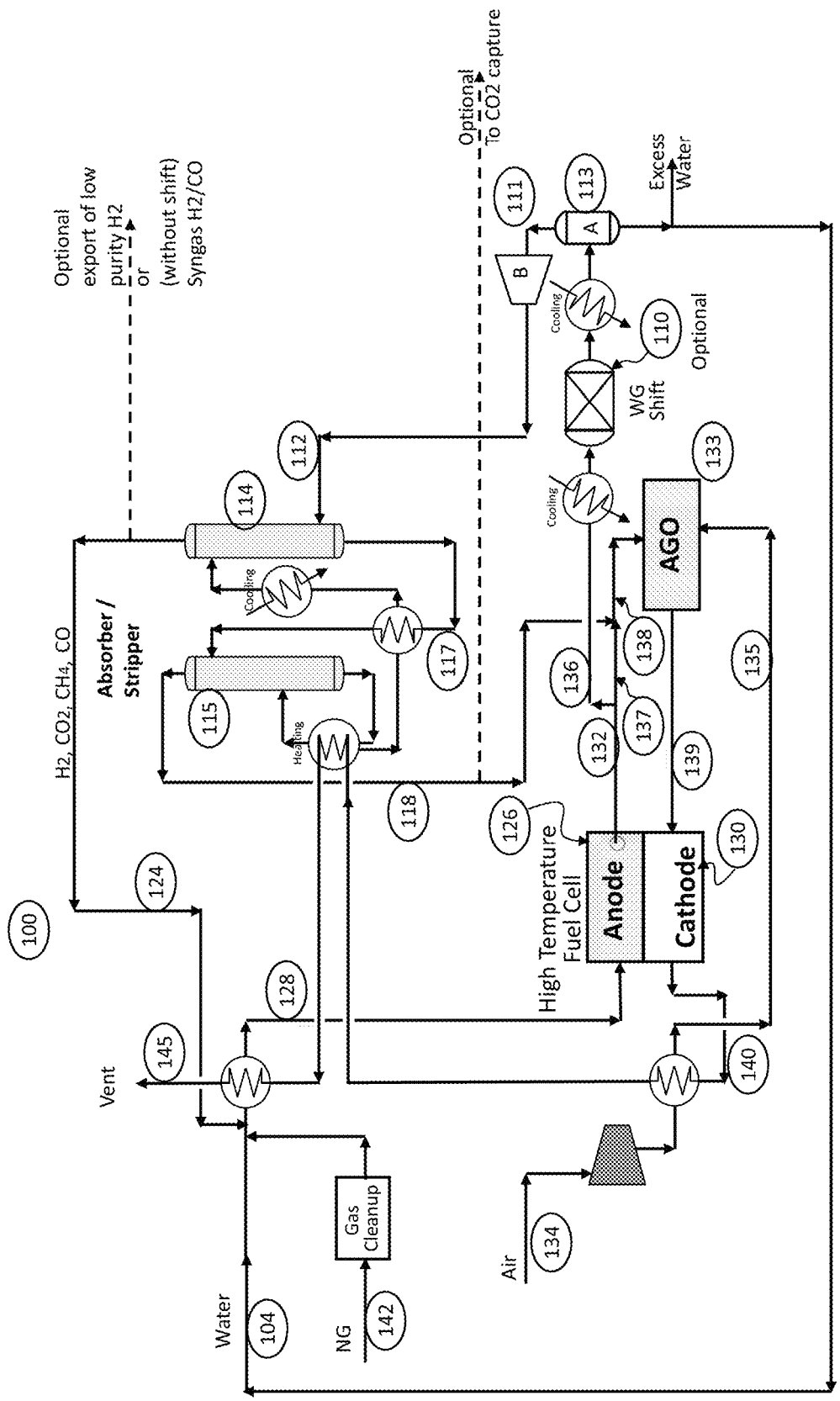
FIG. 1 illustrates a high temperature fuel cell system having an absorption system configured to remove and recover carbon dioxide from anode exhaust gas.

FIG. 1 illustrates a high temperature fuel cell system 100 according to one embodiment. The high temperature fuel cell system 100 includes at least one high temperature fuel cell having an anode 126 and a cathode 130. The fuel cell may be a Molten Carbonate Fuel Cell ("MCFC"), a Solid Oxide Fuel Cell ("SOFC") or other type of fuel cell.

A hydrocarbon stream 142, a water stream 104, and an stream 124 including hydrogen, carbon dioxide, and a hydrocarbon (e.g., methane), are combined and heated to form a anode input stream 128 provided to an input of the anode 126. The hydrocarbon stream 142 comprises at least one of methane, natural gas, propane or other hydrocarbon. In the anode input stream 128, water from the water stream 104 is present in the form of steam.

Operation of the high temperature fuel cell produces an anode exhaust gas 132 comprising mostly carbon dioxide (40 to 80 mole % on a dry basis), water, hydrogen, and carbon monoxide. The anode exhaust gas 132 may be divided into a first portion 136 that is cooled and undergoes a water-gas shift reaction in a shift reactor 110, and a second portion 137 that is fed to an anode gas oxidizer (AGO) 133 either separate from or together with a $CO_2$-rich stream 118 from a stripper column 115 in a AGO input stream 138 (discussed in further detail below). In operation, all of the anode exhaust gas 132 may be provided as the first portion 136, all of the anode exhaust gas 132 may be provided as the second portion 137, or part of the anode exhaust gas 132 may be provided as the first portion 136 with the remainder of the anode exhaust gas 132 provided as the second portion 137. Typically, the split is adjusted to maintain a predetermined cathode inlet temperature to the fuel cell.

Along with the AGO input stream 138 (i.e., the second portion 137 and the $CO_2$-rich stream 118), a pre-heated air stream 135 is also fed to the AGO 133. The AGO 133 oxidizes the AGO input stream 138 to produce high temperature oxidant gas (AGO exhaust stream 139) suitable for use in the cathode 130. By pre-heating the air stream 134 prior to inputting the pre-heated air stream 135 into the AGO 133, the AGO 133 is capable of operating at the desired temperature with a smaller amount of the second portion 137 of the anode exhaust stream. This allows a greater amount of $H_2$ recycle, which increases the system efficiency.

The cathode 130 produces a cathode exhaust gas 140 which is vented as a vent stream 145 from the high temperature fuel cell system 100 after heat is recovered and used to pre-heat the air stream 134, the hydrocarbon stream 142, the water stream 104, and/or the stream 124. In this example, the recovered heat is also used to heat the stripper column 115.

Non-limiting examples of the composition, temperature and pressure of the hydrocarbon stream 142, anode exhaust gas 132, the stream 124, the AGO input stream 138, the anode input stream 128, the pre-heated air stream 135, and the vent stream 145 are provided in FIG. 5.

The anode exhaust gas must be cooled and most of the water condensed prior to being fed to an absorber column 114 for amine absorption. In particular, the first portion 136 of the anode exhaust gas 132 is cooled, shifted, and cooled further before being sent to the absorber column 114. Typically, the anode exhaust is cooled to 400° F. at the inlet to the shift unit. To maximize CO conversion, a low temperature is favored by the equilibrium of the reaction, but the reaction kinetics limit how low the gas can be cooled and still react in a reasonable catalyst volume. The shift reaction is exothermic and the temperature will increase 75° F. to 150° F. in the reactor. For maximum conversion, two stages of shift catalyst are used with cooling in between the stages. In particular, the first portion 136 is cooled and undergoes a water-gas shift reaction in the shift reactor 110, whereby the carbon monoxide and steam are further reacted according to Equation (4) below, using a catalyst which does not enable reforming to produce carbon dioxide and more hydrogen. Increasing the $CO_2$ helps to increase the removal or carbon from the recycle and/or export gas. Examples of shift catalysts that may be used include, but are not limited to, Johnson Matthey KATALCO shift catalysts, BASF CO-Shift catalysts, and Clariant ShiftMax catalysts.

$$CO+H_2O \leftrightarrow CO_2+H_2 \qquad (4)$$

The stream exiting the shift reactor 110 is further cooled to condense the remaining water from the gas, and condensed water is removed from the gas using a knock out pot or other water separation device to produce a stream 111 having a composition primarily of hydrogen and carbon dioxide and a residual of mostly unconverted carbon monoxide and unreacted methane. A typical gas composition for a molten carbonate fuel cell (MCFC) is shown in FIG. 5. For an SOFC, the $CO_2$ dry mole percentage is approximately 50% instead of 70% for MCFC. The cooling steps upstream and downstream of the shift reactor 110 may be performed, for example, via an upstream heat exchanger and a downstream heat exchanger. Some or all of the removed water is recycled as the water stream 104 with excess water being optionally removed from the system. The stream 111 is input into a blower B, which outputs a pressurized absorber feed gas 112 having a pressure greater than the pressure of the stream 111. For amine absorber systems, the blower outlet is typically 3 to 5 psig. This provides enough pressure to send the gas through the absorber and the fuel cell. For a physical solvent absorber system, a higher pressure may be required, 100-300 psig. The shift reactor 110 is optional, but reduces the amount of carbon recycled to the anode feed and allows a slightly higher amount of anode exhaust to be recycled.

Figure 2:
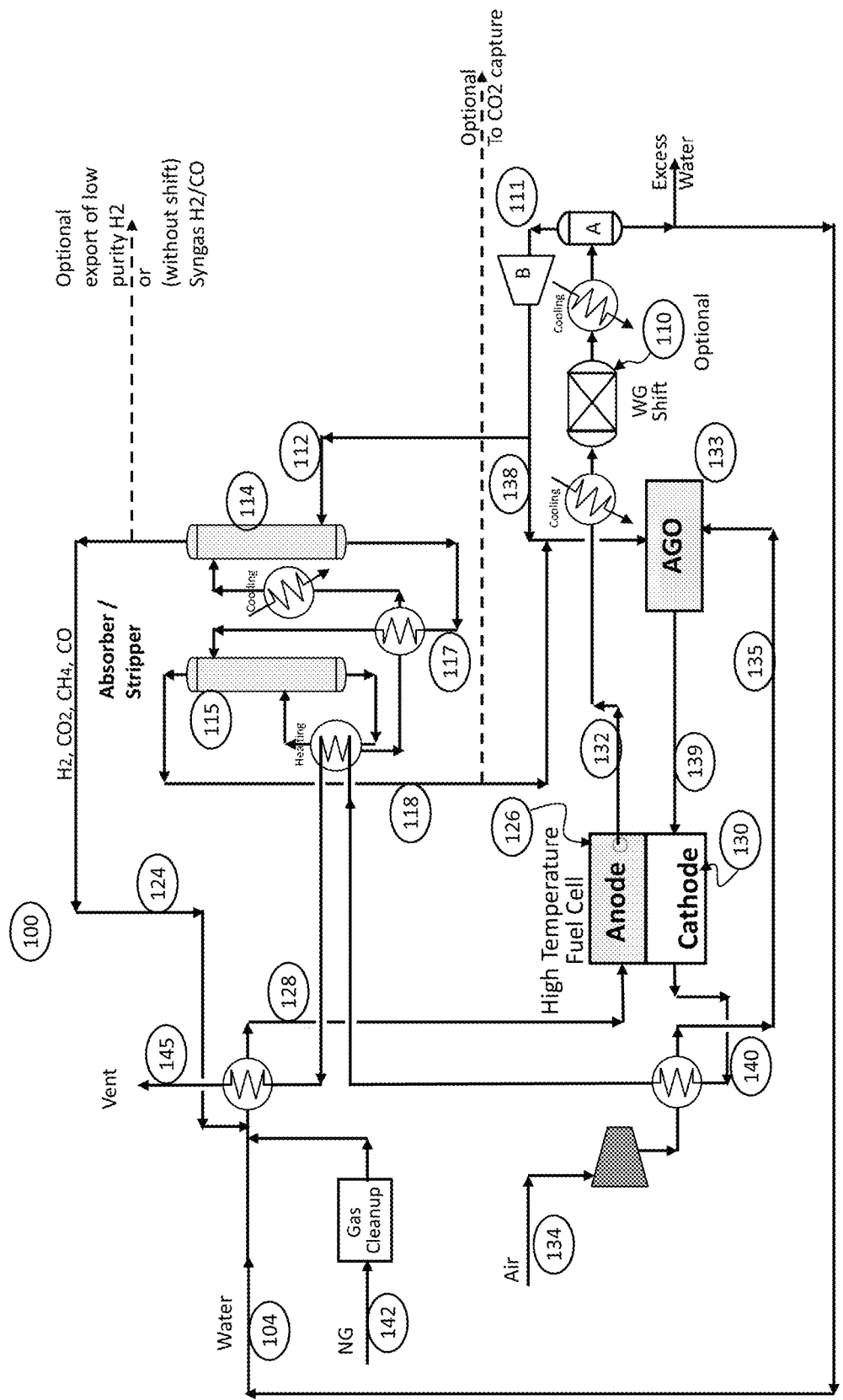
FIG. 2 is the same as FIG. 1, except all the anode gas is sent to the shift/water recovery/blower system and part of the gas from the blower is sent to the anode gas oxidizer (AGO).

The system of FIG. 2 is similar to the system of FIG. 1, except that in FIG. 2, all of the anode exhaust gas 132 is shifted by the shift reactor 110, and the gas output by the blower B is divided into the pressurized absorber feed gas 112 and the AGO input stream 138. The system of FIG. 2 has the advantage of recovering more water, allows control of the anode pressure using the blower, and reduces the amount of water sent to the cathode, which increases the cell life.

The recovery of water has the side benefit of making the system independent of water during normal operation.

The pressurized absorber feed gas 112 is fed to the absorber column 114, which is configured to remove a bulk amount of carbon dioxide contained in the pressurized absorber feed gas 112. In one example, a solvent of the absorber column 114 absorbs the carbon dioxide in the pressurized absorber feed gas 112 at relatively low pressure (e.g., approximately 17 to 20 psia). The resultant gas is output from the absorber column 114 as the stream 124 including hydrogen, carbon dioxide, and methane. Recycling the anode exhaust (after carbon dioxide removal by the absorber column 114) to the fuel cell via the stream 124 reduces the amount of fuel needed, thereby increasing the efficiency of the high-temperature fuel cell system 100.

The solvent having carbon dioxide absorbed therein is output as a liquid effluent stream 117 to a heat exchanger, heated, and supplied to the stripper column 115. The pressure of the stripper column 115 is lower than the pressure of the absorber column 114 such that the carbon dioxide, now contained within the liquid effluent stream 117, is reduced and removed from the liquid effluent stream 117 to regenerate the solvent (e.g., a lean, low $CO_2$ containing solvent). The pressure of the stripper is sufficient to flow the $CO_2$ to the anode gas oxidizer (AGO). The regenerated solvent is discharged from an output end 116 of the stripper column 115, cooled, and fed to the absorber column 114. The carbon dioxide removed from the liquid effluent stream 117 in the stripper column 115 is output from another portion of the stripper column 115 (e.g., an end opposite to the end at which the output end 116 is provided), as the $CO_2$-rich stream 118.

In some examples, the solvent used in the absorber column 114 may be mixtures of dimethyl ethers of polyethylene glycol. A physical solvent is preferred to maximize the ease of solvent regeneration without the use of additional heat.

In some examples, the solvent used in the absorber column 114 may be an amine solution. Some amine solutions, such as those developed by Carbon Clean Solutions, use additives which have been optimized to reduce the amount of heat required for regenerating the amine while still absorbing the $CO_2$ at low pressure. Absorption at low pressure is desirable to minimize the blower power required. Regeneration with less heat is desired to minimize the amount of fuel (second portion 137) sent to the AGO, maximizing the amount of hydrogen recycled and/or exported.

A ChemCad heat and material balance was performed for the high temperature molten carbonate fuel cell system 100 shown in FIG. 2. A summary of the key streams from this balance are shown in FIG. 5. The heat and material balance showed an increase in the electrical efficiency of the fuel-cell from 47% to 54% on an a lower heating value (LHV) basis. In this case, almost all of the fuel cell waste heat was used for feed heating, amine regeneration and air pre-heating. This allows approximately 55% of the anode exhaust to be recycled. In the balance shown, the amount of hydrogen recycled was chosen such that that the high temperature fuel cell system 100 could be balanced without an external source of heat. If an external heat source is available (such as low pressure steam), more of the anode exhaust gas may be recycled, thereby further increasing the efficiency. Although not shown in the figures, fuel such as natural gas, may be added to the anode exhaust going to the AGO (second portion 137). This allows more hydrogen to be exported, while maintaining the required heat input into the system for heat balance purposes, but may not provide a benefit when the anode exhaust is recycled.

In addition, carbon dioxide capture from the system is very efficient, since a high purity carbon dioxide stream is generated from the stripper column 115. Although the carbon dioxide is at low pressure, the high purity would allow liquefaction of the carbon dioxide at lower pressure and/or at a higher temperature with less refrigeration power required. The amount of carbon dioxide captured is limited for a molten carbonate fuel cell operation, since some carbon dioxide in the cathode exhaust is required for proper fuel cell operation.

Figure 3:
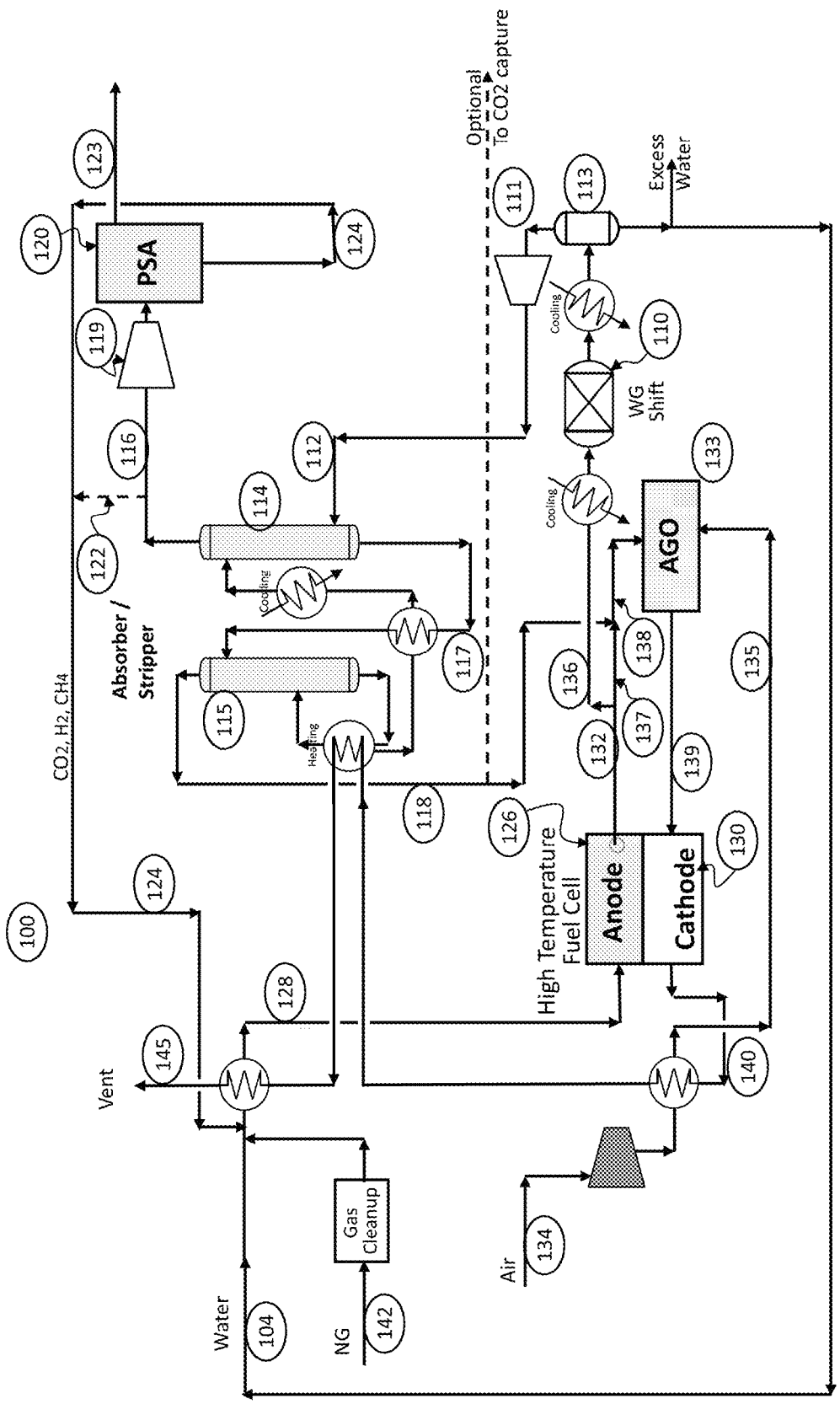
FIG. 3 illustrates the high temperature fuel cell system of FIG. 1 further including a pressure swing adsorption (PSA) system configured to separate and recover a higher purity hydrogen gas from anode exhaust gas.

In other implementations, the high temperature fuel cell system can be used for hydrogen export instead of recycling hydrogen to the fuel cell. Exporting the hydrogen may raise the overall efficiency of the high temperature fuel cell system to around 60%. Referring to FIG. 3, in some examples, the resultant gas (i.e., the gas composed of hydrogen and a hydrocarbon having carbon dioxide removed therefrom in the absorber column 114 is output from the absorber column 114 in a first portion 122 provided to the stream 124 and/or in a second portion 113 provided to a pressure swing adsorption (PSA) system 120 configured to separate the carbon dioxide and other impurities from the hydrogen. In operation, all of the resultant gas may be provided as the first portion 122, all of the resultant gas may be provided as the second portion 113, or part of the resultant gas may be provided as the first portion 122 with the remainder of the resultant gas provided as the second portion 113. Prior to entering the PSA system 120, the second portion 113 is pressurized in a compressor 119. The pressurized second portion 113 (i.e., a PSA feed) is input into the PSA system 120, in which carbon dioxide and other impurities, such as unconverted methane and CO, are removed from the gas stream, leaving pure hydrogen. The carbon dioxide, unconverted methane, and water are discharged from the PSA system 120 as a PSA output stream 125 that combines with the first portion 122 to form the stream 124. A pure hydrogen product stream 123 is also output from the PSA system 120. PSA is based on a physical binding of gas molecules to adsorbent material, with the binding force depending on the gas component, type of adsorbent material, partial pressure of the gas component and operating temperature. Separation, and ultimately purification of the feed gas, is based on differences in binding forces to the adsorbent material. Highly volatile components with low polarity, such as hydrogen, are weakly adsorbed, while molecules such as $CO_2$, CO, hydrocarbons, $N_2$, and water vapor have strong binding affinity to the adsorbent. Consequently, these impurities are adsorbed from a $H_2$-containing stream, and high purity hydrogen is recovered. In one implementation, product stream 123 comprises at least 95 mole % hydrogen. In another implementation, product stream 123 comprises at least 98 mole % hydrogen. In yet another implementation, product stream 123 comprises at least 99 mole % hydrogen. In yet another implementation, product stream 123 comprises at least 99.99 mole% hydrogen.

The product stream 123 may be used to produce higher hydrocarbons such as methanol, other alcohols, or liquids from a Fischer-Tropsch (FT) reaction, especially if no shift reactor is used.

Providing the resultant gas from which carbon dioxide is removed in the absorber column 114 to the PSA system 120 is a beneficial configuration for hydrogen coproduction since a much smaller, more concentrated hydrogen stream is compressed for feeding to the PSA system 120. This smaller stream consumes much less compression power and increases the hydrogen recovery in the PSA system 120. In other words, the implementation of FIG. 3 allows for hydrogen co-production with substantially lower parasitic power loads. This configuration reduces compression power by about 75% (for the same amount of hydrogen). In addition, the capital costs associated with the compressors and the PSA are also reduced, as the compressors and the PSA can be made smaller than in a conventional system where the anode exhaust is sent to the PSA without $CO_2$ removal.

In the system of FIG. 1, FIG. 2, or FIG. 3, carbon dioxide from the $CO_2$-rich stream 118 may be captured. Thus, the systems of FIG. 1-3 may be used to co-produce carbon dioxide, while the system of FIG. 3 may be further used to co-produce high purity hydrogen.

Figure 4:
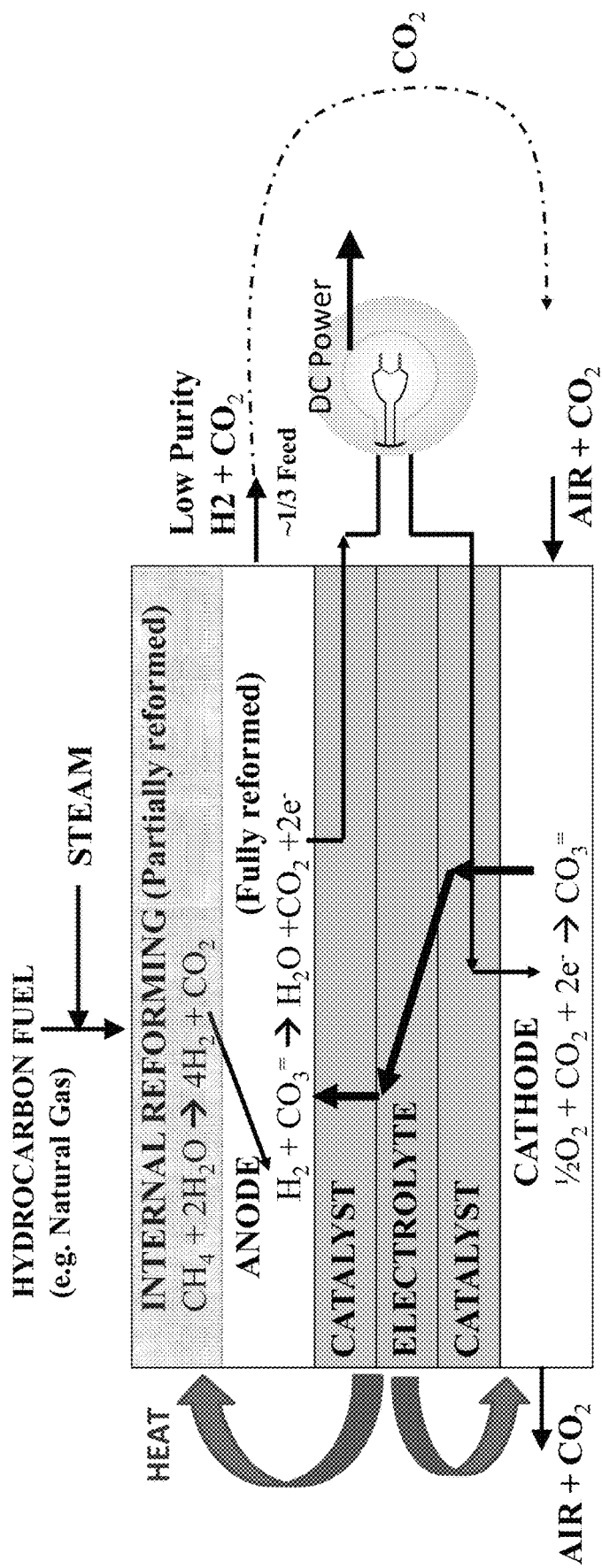
FIG. 4 illustrates the operation of a molten carbon fuel cell that may be used in the system of FIG. 1, FIG. 2, or FIG. 3.

The operation of an internally reforming molten carbonate fuel cell (MCFC) with carbon dioxide transfer is shown in FIG. 4. Hydrocarbon fuel (in this example, natural gas) and steam flow into an indirect internal reformer where it is partially reformed according to the following equation:

$$CH_4 + 2H_2O \rightarrow 4H_2 + CO_2 \qquad (1)$$

The partially reformed fuel then enters the anode of the fuel cell, where it is further reformed by a direct internal reforming catalyst (DIR catalyst) provided within the anode compartment and exposed to the electrolyte of the fuel cell according to the equation:

$$H_2 + CO_3^{2-} \rightarrow H_2O + CO_2 + 2e^- \qquad (2)$$

Air and carbon dioxide recycled from the anode are supplied to the cathode. Thus, in Equation (3), the $CO_3^-$ is produced by the cathode according to the equation:

$$\tfrac{1}{2}O_2 + CO_2 + 2e^- \rightarrow CO_3^{2-} \qquad (3)$$

The electrons travel through an external circuit from the anode to the cathode, providing electrical power (DC power).

In systems including a MCFC, the anode exhaust has a very high carbon dioxide content, since carbon dioxide from the cathode is transferred to the anode during normal operation (see FIG. 4). This limits the amount of anode exhaust that can be recycled unless the carbon dioxide in the anode exhaust that is being recycled is removed, because the carbon dioxide build-up in the anode feed reduces the voltage produced by the fuel cell to an unacceptable level with a relatively small amount of recycle. In systems including other high temperature fuel cells, such as a solid oxide fuel cell (SOFC), only oxygen is transferred from the cathode to the anode during normal operation. During normal operation of high temperature fuel cells including MCFCs and SOFCs, the anode exhaust is at a low pressure, for example, a pressure of approximately 15 to 18 psia, which makes it difficult to remove carbon dioxide from the anode exhaust.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application. For example, the heat recovery heat exchangers may be further optimized.

What is claimed:

1. A fuel cell system for removing carbon dioxide from anode exhaust gas, the fuel cell system comprising:
    a fuel cell having an anode configured to output an anode exhaust gas comprising hydrogen, carbon monoxide, carbon dioxide, and water;
    an anode gas oxidizer; and
    an absorption system configured to receive the anode exhaust gas, the absorption system comprising:
        an absorber column configured to absorb the carbon dioxide from the anode exhaust gas in a solvent and to output a resultant gas comprising hydrogen and a hydrocarbon that is at least partially recycled to the anode, and
        a stripper column configured to regenerate the solvent and to output a carbon dioxide-rich stream, wherein:
    the anode gas oxidizer is configured to receive and oxidize an anode gas oxidizer input stream and at least a portion of the carbon dioxide-rich stream; and
    the anode gas oxidizer input stream comprises a portion of the anode exhaust gas.

2. The fuel cell system of claim 1, wherein another portion of the carbon dioxide-rich stream output by the stripper column is captured.

3. The fuel cell system of claim 1, wherein the solvent comprises an amine solution.

4. The fuel cell system of claim 1, wherein the solvent comprises mixtures of dimethyl ethers of polyethylene glycol.

5. The fuel cell system of claim 1, further comprising:
    a shift reactor configured to receive a first portion of the anode exhaust gas and to output a stream primarily comprising hydrogen and carbon dioxide;
    a first heat exchanger located upstream of the shift reactor, the first heat exchanger configured to cool the first portion of the anode exhaust gas; and
    a second heat exchanger located downstream of the shift reactor, the second heat exchanger configured to cool the stream primarily comprising hydrogen and carbon dioxide.

6. The fuel cell system of claim 5, further comprising:
    a water recovery system downstream of the second heat exchanger, the water recovery system configured to recover water from the cooled output stream and to recycle the recovered water to the anode.

7. The fuel cell system of claim 6, wherein the anode is configured to receive a fuel gas comprising the resultant gas from the absorber column, the recovered water from the water recovery system, and a hydrocarbon stream comprising at least one of methane, natural gas, propane or other hydrocarbon.

8. The fuel cell system of claim 1, further comprising a pressure swing adsorption system configured to receive at least a portion of the resultant gas from the absorber column and to separate hydrogen from the resultant gas.

9. The fuel cell system of claim 8, wherein:
    the pressure swing adsorption system is configured to output a first stream comprising the hydrogen and a second stream comprising carbon dioxide and the hydrocarbon; and
    the second stream is recycled to the anode.

10. The fuel cell system of claim 1, wherein the anode gas oxidizer is further configured to receive a pre-heated air stream.

11. The fuel cell system of claim 10, further comprising a cathode configured to output a cathode exhaust gas, wherein:
    the cathode exhaust gas is configured to heat an air stream to produce the pre-heated air stream; and
    the cathode exhaust gas is configured to heat the stripper column to produce a lean solvent.

12. The fuel cell system of claim 1, further comprising a cathode configured to output a cathode exhaust gas, wherein the cathode exhaust gas is configured to heat fuel gas upstream of the anode.

13. A method of removing carbon dioxide from fuel cell anode exhaust gas, the method comprising:
    outputting anode exhaust gas comprising hydrogen, carbon monoxide, carbon dioxide, and water from an anode;
    receiving an anode gas oxidizer input stream in an anode gas oxidizer;
    receiving the anode exhaust gas in an absorption system comprising an absorber column having a solvent therein and a stripper column;
    absorbing the carbon dioxide from the anode exhaust gas in the solvent and outputting, from the absorber column, a resultant gas comprising hydrogen and a hydrocarbon that is at least partially recycled to the anode;
    regenerating the solvent and outputting, from the stripper column, a carbon dioxide-rich stream; and oxidizing the anode gas oxidizer input stream and at least a portion of the carbon dioxide-rich stream to produce an oxidant gas,
wherein the anode gas oxidizer input stream comprises a portion of the anode exhaust gas.

14. The method of claim 13, further comprising capturing another portion of the carbon dioxide-rich stream.

15. The method of claim 13, wherein the solvent comprises an amine solution.

16. The method of claim 13, wherein the solvent comprises mixtures of dimethyl ethers of polyethylene glycol.

17. The method of claim 13, further comprising:
receiving a first portion of the anode exhaust gas in a shift reactor;
performing a water-gas shift reaction in the shift reactor to produce an output stream primarily comprising hydrogen and carbon dioxide;
cooling the first portion of the anode exhaust gas prior to entering the shift reactor; and
cooling the output stream of the shift reactor.

18. The method of claim 17, further comprising:
recovering water from the cooled output stream; and
recycling the recovered water to the anode.

19. The method of claim 18, further comprising receiving a fuel gas at the anode that comprises the resultant gas from the absorber column, the recovered water from a water recovery system, and a gas stream comprising at least one of methane or natural gas.

20. The method of claim 19, further comprising heating the fuel gas, upstream of the anode, using cathode exhaust gas.

21. The method of claim 13, further comprising:
separating hydrogen from the resultant gas using a pressure swing adsorption system.

22. The method of claim 21, further comprising:
outputting, from the pressure swing adsorption system, a first stream comprising hydrogen;
outputting, from the pressure swing adsorption system, a second stream comprising carbon dioxide and the hydrocarbon; and
recycling the second stream to the anode.

23. The method of claim 13, further comprising:
heating an air stream using cathode exhaust gas to form a pre-heated air stream; and
providing the pre-heated air stream to the anode gas oxidizer.

* * * * *